April 9, 1935.　　　D. J. EVANS　　　1,996,799
ELECTROLYTIC CELL
Filed Jan. 31, 1934
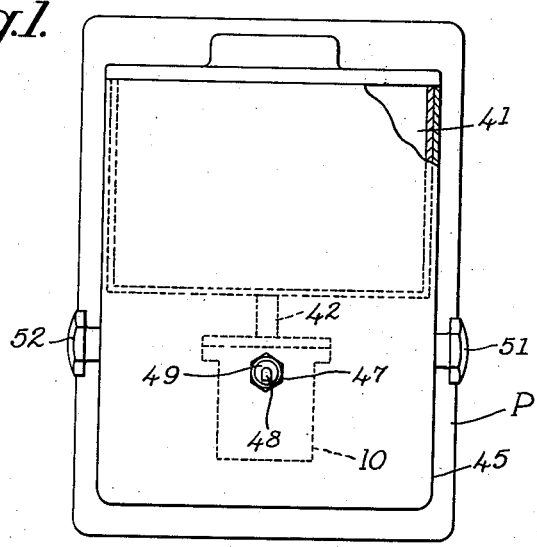
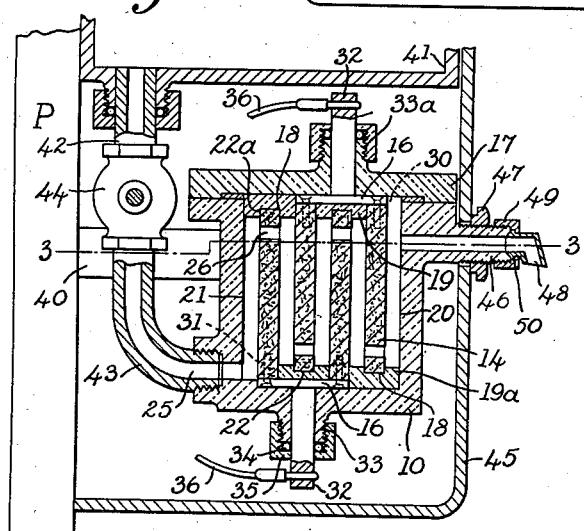
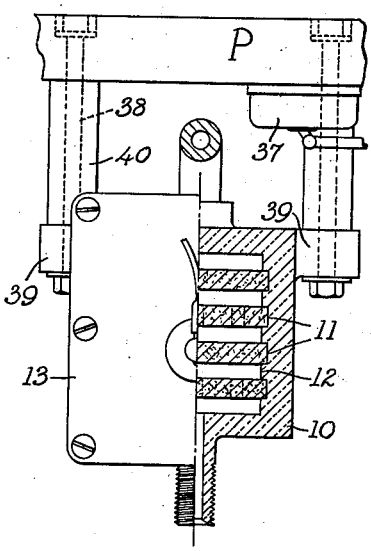
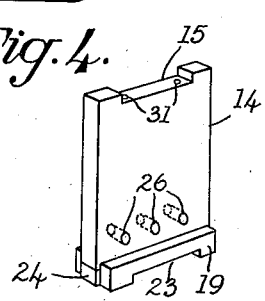
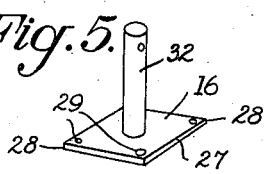
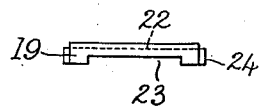
Inventor
David Johnson Evans
By Bennie Davis Marvin Edmonds
Attorneys Patented Apr. 9, 1935

1,996,799

UNITED STATES PATENT OFFICE 1,996,799

ELECTROLYTIC CELL

David Johnson Evans, Tonbridge, England

Application January 31, 1934, Serial No. 709,090
In Great Britain October 20, 1933

8 Claims. (Cl. 204—5)

This invention relates to electrolytic cells, for example cells of the kind employed for the electrolysis of brine, and it has for its main object to provide an improved arrangement of cell which is especially suitable for comparatively small or portable apparatus in connection with the chlorination of water for drinking purposes, and for the production of electrolytic bleach and of disinfectants and germicides, for example chloramine; other objects of the invention are to increase the efficiency of the cell while maintaining relatively small dimensions, by utilizing substantially the whole area of both sides of the electrodes and by ensuring active and uniform circulation of the electrolyte, and to facilitate the mounting and replacement of the electrodes.

The invention is hereafter described with reference to the accompanying drawing, which illustrates a preferred embodiment and in which:—

Figure 1 is a front elevation of an electrolytic cell and brine reservoir, mounted on a panel.

Figure 2 is a cross section of the cell and lower end of the reservoir.

Figure 3 is a plan view of the cell, the right half being seen in section on the line 3—3 of Figure 2.

Figure 4 represents one of the electrodes resting on an insulating spacer.

Figure 5 shows one of the metallic connectors employed.

Figure 6 is an elevation of one of the insulating spacers.

The electrolytic cell comprises a container 10 made of hard rubber or other insulating material, having internal spacing grooves 11 formed vertically in two opposite sides 12, 13 for receiving the edges of the electrodes, the latter being in the form of substantially rectangular plates 14 of carbon or other suitable material with one horizontal edge notched at 15, and alternate electrodes being connected electrically in parallel by metallic connectors 16 arranged respectively at the bottom of the cell and on the interior of the detachable cover 17. The free top and bottom edges 18 of the alternate electrodes are socketed into insulating spacers 19, made of hard rubber or other suitable material fitted between the adjacent electrodes or (in the case of the two extreme spacers 19a) between the adjacent electrode and the front wall 20 or rear wall 21 of the cell; each spacer 19 has a central longitudinal groove 22 adapted to receive the edge of the electrode supported thereby and is notched at 23 transversely on its other face to accommodate the metallic connector 16 extending between the two adjacent electrodes of the opposite polarity. The extreme spacers 19a are similarly grooved at 22a and may also be notched transversely, but in this case the notches will be unoccupied. The ends of the spacers 19, 19a are formed as tenons 24 fitting in the same spacing grooves 11 as the electrodes 14 which they support.

The circulation of the electrolyte in the cell follows a sinuous path from an inlet 25 in the wall 21 at the back of the cell, up the space between that wall and one extreme electrode, then through all the electrodes 14 and the intervening spaces, passages for this purpose being formed in the electrodes for example as three holes 26 located in a row adjacent to the free edge 18 supported by the spacer 19, 19a, and out from the last space through the other wall 20 at the front of the cell.

Each metallic connector 16, may consist, as shown in Figure 5, of a flat plate 27 of rectangular shape, adapted to fit in the notches 15 formed in the ends of the electrodes and in the notches 23 made in the backs of the spacers 19, their length in the transverse direction depending upon the number of electrodes 14 to be connected in parallel; through the corners 28 of the plate, counter-sunk holes 29 are provided for screws 30 to be passed into screwthreaded holes 31 in the thickness of the electrode so as to make good electrical connection therewith. From the back of each connector plate 27 there extends a terminal post 32, preferably integral with the plate, the post passing out through a boss 33 in the bottom of the cell or a similar boss 33a in the detachable cover 17 respectively and being rendered liquid-tight by a packing ring 34 of rubber or the like compressed around the post by a gland nut 35 screwing upon the outer end of the boss. To the projecting ends of the posts 32, current leads 36 are connected in any convenient manner, controlled by a switch 37.

The cell is shown mounted upon a supporting panel P by means of bolts 38 passing through lugs 39 molded externally on the side walls 12, 13 of the cell, tubular distance pieces 40 of hard rubber or the like being fitted around the bolts between the lugs 39 and the face of the panel. A reservoir 41 for electrolyte is conveniently mounted above the cell upon the same panel with pipe connections 42, 43 to the inlet through a control valve 44, and an outer casing 45 may be provided to enclose the bottom of the reservoir 41 and the cell 10, with a discharge outlet 46 passing from the front of the cell near its top through the casing 45, to which it is clamped by a ring nut 47, beyond which a suitable spout 48, made for example of metal, is attached by a gland nut 49 with packing ring 50. External handles 51 and 52 respectively are indicated for the operation of the switch 37 and valve 44 respectively, these latter being preferably interlocked in the known manner so that the switch cannot be closed until the valve is open; for example the hand-controlled valve may operate the switch or there may be employed an automatic control by electromagnetic means.

The discharge level of the spout 48 is preferably such that the cell remains filled with liquid up to the height of the upper passage holes 26 in the electrodes. The polarity of the electrodes 14 may be so arranged that the major evolution of gas occurs in the spaces where the liquid flows in an upward direction, so that the gas generation assists the siphonic flow of the electrolyte; this not only increases the rate of circulation with a given head of liquid in the reservoir, but also ensures the removal of deposits from the surface of the electrodes by the scouring action of the liquid.

What I claim is:—

1. An electrolytic cell comprising a container for electrolyte, parallel interspaced electrodes within said container, said electrodes fitting laterally in vertical spacing grooves in said container and occupying alternately higher and lower positions in said grooves, insulating spacers fitted between electrodes at top and bottom of said container, the top and bottom spacers being grooved longitudinally to receive respectively the upper edges of the lower positioned electrodes and the lower edges of the higher positioned electrodes, electrical connectors extending through transverse notches in said spacers, metallic means for securing said connectors to the ends of the electrodes on opposite sides of said spacers, means for admitting electrolyte to said container for flow through the spaces between said electrodes, said electrodes having passages formed therethrough to connect the spaces on opposite sides of the electrodes, and means for discharging the products of electrolysis.

2. An electrolytic cell comprising a container for electrolyte, parallel interspaced electrodes within said container, said electrodes fitting laterally in vertical spacing grooves in said container and occupying alternately higher and lower positions in said grooves, insulating spacers fitted between electrodes at top and bottom of said container, said spacers including means for engaging said grooves, the top and bottom spacers receiving respectively the upper edges of the lower positioned electrodes and the lower edges of the higher positioned electrodes, electrical connectors of opposite polarity for said lower and higher positioned electrodes, said connectors extending through transverse notches in said spacers and connecting with alternate electrodes, means for admitting electrolyte to said container for flow through the spaces between said electrodes, said electrodes having passages formed therethrough to connect the spaces on opposite sides of the electrodes, and means for discharging the products of electrolysis.

3. An electrolytic cell comprising a container for electrolyte, said container being of substantially rectangular shape internally, a cover for said container, two opposite internal sides of said container being formed with vertical interspaced grooves, substantially rectangular plate electrodes mounted in said container with their lateral edges fitting in said interspaced grooves, electrical connectors of opposite polarity connected to alternate electrodes respectively, one of said connectors resting on the bottom of said container and the other beneath said cover, insulating spacers between the electrodes connected to the respective connectors, each of said spacers being grooved to receive the adjacent edge of the electrode located between the connected electrodes, and notched transversely on its opposite face to receive the connector of said connected electrodes, means for admitting electrolyte to said container for flow through the spaces between said electrodes, said electrodes having passages formed therethrough to connect the spaces on opposite sides of the electrodes, and means for discharging the products of electrolysis.

4. In an electrolytic cell having opposite walls formed with parallel grooves to receive the electrodes, the combination of parallel interspaced electrode plates fitting in said grooves, alternate plates being displaced in opposite directions along said grooves, spacers fitted between the outwardly displaced edges of alternate plates and supporting the inwardly displaced edge of the intermediate plate, projections on said spacers to engage said grooves, and electrical connectors engaging the outwardly displaced edges of said plates, said connectors traversing recesses in the spacers between the connected plates.

5. Electrolytic apparatus comprising a reservoir for electrolyte, a cell including a container, a detachable cover, plate electrodes fitting in parallel vertical grooves in said container, said electrodes occupying alternately higher and lower positions in said grooves, insulating spaces fitted between electrodes at top and bottom of said container, and electrical connectors of opposite polarity for said higher and lower positioned electrodes respectively, said connectors extending through transverse notches in said spaces and connecting with alternate electrodes, controlled means for admitting electrolyte from said reservoir to said container for flow through the spaces between said electrodes, said electrodes having passages formed through their thickness adjacent to the lower edges of the higher positioned electrodes and to the higher edges of the lower positioned electrodes, and means for discharging the products of electrolysis, the outlet of said discharging means being higher than the lowest point of said passages adjacent to the higher edges of the lower positioned electrodes.

6. In an electrolytic cell, the combination of parallel interspaced electrode plates, alternate plates being displaced in opposite directions, insulating spacers fitted between the outwardly displaced edges of alternate plates, each of said spacers being grooved longitudinally to receive the inwardly displaced edge of the intermediate electrode plate, and means for tying together the ends of the electrode plates on opposite sides of said spacers, said tying means being accommodated in transverse recesses in the spacers on the face remote from the intermediate electrode plates.

7. In combination with an electrolytic cell container having opposite walls formed with parallel grooves to receive the electrodes, an electrode spacer consisting of a block of insulating material, with a groove centrally along one face of said block to receive the edge of an electrode supported by said block, with a transverse notch upon the opposite face of said block to accommodate a connection between the electrodes separated by said spacer, and with tenons formed at the ends of said block to engage said grooves in proximity to the edges of said supported electrode.

8. In an electrolytic cell having parallel interspaced electrodes, an electrode of rectangular plate shape, having one edge notched to receive an electrical connector, the bottom of said notch being formed with holes in the thickness of the electrode, said holes being screwthreaded to receive screws securing said electrical connector, and said electrode being formed with a plurality of holes through its thickness adjacent to the opposite edge.

DAVID JOHNSON EVANS.